United States Patent [19]

Earing et al.

[11] 4,313,858
[45] Feb. 2, 1982

[54] POLYURETHANE ENCAPSULATING RESINS

[75] Inventors: Mason H. Earing, Williamsville, N.Y.; Paul F. Martin, Fairfield, Ohio; Glenn H. Petschke, Tonawanda, N.Y.

[73] Assignee: Textron, Inc., Providence, R.I.

[21] Appl. No.: 157,868

[22] Filed: Jun. 9, 1980

[51] Int. Cl.$^3$ ............... C08G 18/04; C08G 18/69
[52] U.S. Cl. ........................... 260/18 TN; 260/23 TN
[58] Field of Search ....... 260/18 TN, 23 TN, 23.7 N, 260/33.6 AQ, 33.6 UB

[56] References Cited

U.S. PATENT DOCUMENTS

| | | | |
|---|---|---|---|
| Re. 30,321 | 7/1980 | Brauer et al. | 260/187 N |
| 2,877,212 | 3/1959 | Seligman | 260/33.6 UB |
| 3,338,861 | 8/1967 | Mastin et al. | 260/33.6 UB |
| 3,384,653 | 5/1968 | Erner et al. | 260/453 |
| 3,427,366 | 2/1969 | Verdol et al. | 260/33.6 UB |
| 3,674,743 | 7/1972 | Verdol et al. | 260/33.6 UB |
| 3,714,110 | 1/1973 | Verdol et al. | 260/33.6 AQ |
| 3,933,705 | 1/1976 | Olstowski | 260/33.6 UB |
| 4,032,500 | 6/1977 | Koch et al. | 260/33.6 UB |
| 4,098,844 | 7/1978 | Tsugukuni et al. | 260/33.6 UB |

OTHER PUBLICATIONS

"Poly B–D Liquid Resins", Product Data Bulletin 505, Sinclair Petrochemicals, Inc., 1965, pp. 2, 7, 20, 40, 41, 43 & 44.

Primary Examiner—Ronald W. Griffin
Attorney, Agent, or Firm—Bernard, Rothwell & Brown

[57] ABSTRACT

A thermally-stable polyurethane encapsulating resin system which comprises a polyurethane prepolymer made by reacting a polyisocyanate with a polyol to form an isocyanate-terminated prepolymer. A second component of the system is a curing polyol for reacting with the prepolymer to form a polyurethane polymer having pendant vinyl groups provided by the use in said system of a hydroxy-terminated diene polymer. The system also contains a drying oil having an iodine number of up to about 200 in an amount sufficient to reduce the viscosity of the composition and improve filler loading. The system also contains a peroxide catalyst in an amount sufficient to promote cross-linking of the pendant vinyl groups of the intermediate polyurethane polymer to provide a thermally-stable polyurethane resin product, and promote the reaction of the drying oil into the product during curing.

20 Claims, No Drawings

POLYURETHANE ENCAPSULATING RESINS

This invention relates to thermally-stable polyurethanes. More particularly, the invention relates to polyurethane resin systems especially useful as encapsulants, wherein pendant vinyl groups of an intermediate urethane polymer product are reacted in the presence of a peroxide catalyst. The pendant vinyl groups are supplied by a hydroxy-terminated diene polymer, and the system contains a drying oil that serves to improve the viscosity and other characteristics of the products.

Urethane polymer systems prepared using various hydroxy-terminated, diene polymers and polyisocyanates as starting materials are well known, see, for example, U.S. Pat. Nos. 3,714,110; 3,674,743; 3,338,861 and 2,877,212, all of which are incorporated herein by reference. Generally, products made from such resin systems are hydrolytically-stable and may be characterized by other desirable properties such as high abrasion resistance, good solvent resistance and outstanding tensile properties. It has also been suggested that these resin materials may be useful, for instance, as liquid castable elastomers, foams, adhesives, caulks, sealants, as well as potting and encapsulating compositions. In general, however, such resin systems are characterized by poor stability, including weight loss, hardness change and swelling upon exposure to relatively high temperatures of about 200° C. or above, which has limited their use in applications where resistance to degradation upon exposure to relatively high temperatures may be required, for instance, in electrical encapsulating systems.

U.S. Pat. No. 3,714,110 discloses oil-extended or diluted urethane resin systems made from hydroxy-terminated, diene polymers. The diene polymers can be reaction-extended with diisocyanates, and the products can be cured via sulfur or peroxide cures, e.g., see column 3, lines 49 to 56. Although the patent is mostly concerned with the use of petroleum-derived oils there is mention of various oils, including unsaturated vegetable oils, e.g., castor oil, see column 14, lines 10 to 14. While possessing desired low viscosity properties, generally, such systems are characterized by excessive swelling under conditions of moderately high temperature use, for instance in encapsulating compositions, which is undesirable.

It is also known, as disclosed in U.S. Pat. No. 3,674,743, at column 7, line 65 et seq., that the proximate chains of polyurethane polymers made from polyisocyanates and hydroxy-terminated, diene polymers may be reacted, if desired, through polydiene residues by employing gamma radiation, sulfur or sulfur-based vulcanizing agents to promote cross-linking. While the use of these promoters according to the disclosure might increase the thermal stability of the urethane polymers, although there is no disclosure of this result, gamma radiation and sulfur vulcanization techniques would be undesirable for an encapsulating composition. The sulfur compounds, for instance, would produce corrosion of copper conductors. It is also known that hydroxy-terminated, polybutadiene-derived, two-step urethane systems may be cured using peroxides in oil-extended or non-oil-extended systems. (See "Poly B-D liquid resins", Product Data Bulletin 505, Sinclair Petrochemicals, Inc., pp. 2, 7, 20, 40, 41 and 43, 1965.) There is, however, no disclosure in the publication of the presence of a drying oil in these systems. Urethane varnishes and high performance coatings made from drying oil-modified polyurethanes are discussed in the 505 bulletin, beginning on page 43.

The present invention provides polyurethane resin systems having the processing advantages typical of urethane systems of desirably low viscosity characteristics, while the cured products possess exceptional thermal stability at elevated temperatures, and good flexibility and surface properties. The systems of the present invention generally are two component types, a polyurethane prepolymer first component and a curing polyol second component. A hydroxy-terminated, diene polymer is used in making at least one of these components. The polyurethane prepolymer may be made by reacting a polyisocyanate with a first polyol to form an isocyanate-terminated prepolymer. Preferably, the prepolymer has an isocyanate group content of at least about 10 weight percent. The curing polyol component is provided for reacting with the prepolymer to form a urethane polymer having pendant vinyl groups that is derived from the diene component of either or both of the first and second polyol components. The systems also contain, preferable in the curing polyol component, a peroxide catalyst in an amount sufficient to promote reaction of the pendant vinyl groups to provide relatively thermally-stable polyurethane resin products. The resin system of the present invention is further provided with a drying oil having a maximum iodine number of up to about 200 IV in an amount sufficient to substantially reduce the viscosity of the uncured products. The drying oil may also serve to improve the flexibility and filler loading capacity of the cured products, and at least in some products, the oil exhibits softening and anti-oxidant properties. The drying oil may be provided in said system by prior incorporation in the polyurethane prepolymer component or, preferably, in the curing polyol second component. In addition to the drying oil serving to improve the viscosity and handling characteristics of the prepolymer or the curing polyol when either contains the hydroxy-terminated diene polymer component, the drying oil not only does not materially detract from the desired properties of the polymers as some diluent oils might do, but, instead, improves the characteristics of the cured products as noted above. Apparently the peroxide component serves to react the drying oil into the chemical structure of the product, and the oil component, therefore, does not exude from the cured products in the manner that other plasticizing agents would.

The polyurethane prepolymer component can be made by reacting a polyisocyanate with a first polyol. The polyisocyanate may be bifunctional, i.e., a diisocyanate, or it may have more than two isocyanate groups per molecule, providing the urethane prepolymer compositions are not unduly deleteriously affected. The polyisocyanates which are useful in preparing the polyurethane prepolymer of the invention are essentially hydrocarbon polyisocyanates, and are preferably the aromatic, aliphatic and alicyclic polyisocyanates. The polyisocyanates can contain non-interfering groups, e.g., aliphatic hydrocarbon radicals such as lower alkyl or other groups, having substantially non-reactive hydrogens as determined by the Zerewitinoff test, *J. Am. Chem. Soc.*, 49 3181 (1927). The polyisocyanate often has at least about 6 carbon atoms and usually does not have more than about 40 carbon atoms. Polyisocyanates of about 8 to 20 carbon atoms in the hydrocarbon group are preferred. Suitable polyisocyanates include 2,4-toluene diisocyanate; 2,6-toluene diisocyanate; 1,4-cyclohexane diisocyanate; dicyclohexylmethane 4,4'-diisocyanate; diphenylmethane 4,4'-diisocyanate; diphenylmethane 3,4'-diisocyanate; xylene diisocyanate; 1-isocyanato-3-isocyanatomethyl-3,5,5-trimethylcyclohexane; hexamethylene diisocyanate; methylcyclohexyl diisocyanate; 2,4,4-trimethylhexylmethylene diisocyanate, polymeric polyisocyanates and the like.

A particularly preferred group of polyisocyanates which may be employed are the normally liquid, relatively non-volatile, aromatic polyisocyanates of the type disclosed in copending patent application Ser. No. 25,046 filed Mar. 29, 1979, now U.S. Pat. No. 4,234,714 issued Nov. 18, 1980 (incorporated by reference). These polyisocyanates may be characterized as having vapor pressures that are, for example, less than about 0.0005 mm Hg at 25° C., or even less than about 0.0001 mm Hg at 25° C. Among these particularly preferred polyisocyanates is Upjohn's ISONATE 143L, a trihydrocarbyl phosphate-modified methylene bis-(phenylisocyanate) of the type disclosed in U.S. Pat. No. 3,384,653 (incorporated by reference); PAPI 901 (also sold by Upjohn), and Mondur MRS-10 (M432), sold by Mobay Chemical Co., the latter two being polyarylene polymeric polyisocyanates.

The advantageous process disclosed in said patent application Ser. No. 25,046 for making urethane prepolymers from hydroxy-terminated diene polymers and the normally liquid, relatively non-volatile polyisocyanates, provides prepolymer products that resist the tendency to form multiple phases or layers upon storage at room temperature even though they have an isocyanate group (NCO) content of at least about 10%. The process involves preparation of the prepolymer by reacting the hydroxy-terminated diene polymer and normally liquid, non-volatile polyisocyanate at a temperature which ranges above about 150° C. Generally, reaction temperatures above about 200° C. are not required, and temperatures that are too high may have a deleterious effect on the product or reaction system. The preferred reaction temperatures are about 160° to 180° C. The reaction is continued long enough to give the desired stable, single phase product, and generally the urethane-forming reaction will be substantially completed at such time. Reaction times of about an hour or more, for example, about 1.5 to 4 hours have been found to be suitable. The isocyanate group content of the prepolymer reaction products may be present substantially entirely as part of the urethane structure, although a small amount of unreacted polyisocyanate may well be present. Thus, the products may contain minor amounts of unreacted polyisocyanate which may even contribute substantially to the total isocyanate group content of the products which generally does not exceed about 20%. In some advantageous forms of the invention these prepolymers contain at least a substantial amount of the said total drying oil component in the overall system. Such amounts may even, for instance, be the total amount of drying oil in the overall product of the invention. If desired, a minor amount of benzoyl chloride may be added to the product after formation to stabilize the prepolymer against haze formation due to moisture pickup, although this additive is generally not required to provide a product prepolymer having the desired stable, single phase characteristics.

In making the products of the present invention the polyol reacted with the polyisocyanate to form the polyurethane prepolymer first component preferably includes polyol having more than about two hydroxyl groups per average molecule, e.g., a functionality of at least about 2.1. The polyol should be selected to provide good hydrolytic stability and flexibility characteristics in the product resin. Polyols which may be used include hydroxy-terminated diene polymers of the types described herein, castor oil and even polyether polyols, although the latter may detract from the hydrolytic stability characteristics of the product. The polyol reactant used to form the prepolymer may preferably include one or more hydroxy-terminated diene polymers, although other polyhydroxy reactants may also be present even in the preferred embodiments of the invention. In any event a sufficient amount of hydroxy-terminated, diene polymer is present in the resin product (provided in either or both of the polyol reactants used to make the prepolymer or in the curing polyol component) to provide adequate pendant vinyl reactive sites in the intermediate product to result in the desired thermal stability and other advantageous properties of the ultimately cured product resin.

The polyisocyanate and polyol materials that are used to form the polyurethane prepolymer component can be reacted in amounts to give an isocyanate-terminated prepolymer having, for instance, an isocyanate group content of at least about 10 weight percent. The isocyanate group content may be, for example, up to about 20 or 25 or more weight percent of the prepolymer. Thus the total amounts of polyisocyanate reactant and polyol, or other polyfunctional material reactive with the polyisocyanate, are such that sufficient polyisocyanate reactant is present to form the prepolymer. The reaction mixture may contain other reactive materials as long as they are not used in such amounts that the prepolymer product is unduly adversely affected.

The curing polyol component for reacting with the isocyanate-terminated prepolymer to form a resin polyurethane preferably includes polyol having more than about two hydroxyl groups per average molecule, e.g., about 2.1 or 2.3 to about 3 or more. The curing polyol may be the same or different from the polyol used to form the prepolymer, but should be selected based upon considerations used in determining the prepolymer polyol component, i.e., to provide good hydrolytic and thermal stability, flexibility and other desired characteristics in the cured product resin. Thus, polyols which may be employed include hydroxy-terminated diene polymers, castor oil and even polyether polyols, although the latter may detract from the hydrolytic stability characteristics of the product. The amount of curing polyol present is generally sufficient to more or less completely react with the free isocyanate group content of the prepolymer, at least when taking into account any other isocyanate-reactant materials present.

As mentioned above, the urethane polymer formed by reaction of the polyisocyanate prepolymer and the curing polyol contains pendant vinyl groups which are apparently reacted when forming the cured resin product. These reactive sites are provided in the resin intermediate polymer by the presence of the hydroxy-terminated diene polymer reactant in either or both of the polyol reactants used to form the urethane prepolymer, or the curing polyol second component. Although the diene polymer reactant may be the only polyhydroxy material utilized in making the prepolymer or in the curing polyol, other polyols may also be present, but, if so, they generally are a minor weight amount of the total polyhydroxy component in the system. The hydroxy-terminated diene polymer component provides a substantial amount of the total hydroxyl functionality for reaction with the polyisocyanate, preferably the major amount or even essentially all of this functionality. Other materials reactive with isocyanate groups may also be present, although generally in minor amounts based on the total functionality of materials present that are reactive with isocyanate groups.

The hydroxy-terminated, diene polymers useful in this invention contain a relatively long, essentially hydrocarbon chain due to polymerization of the diene component, with or without additional monomers. The diene polymers are generally in the form of viscous oils, i.e., they are normally liquid, at ambient temperature. The molecular weight of these polymers may be in the range of about 400 to 25,000, preferably about 500 to 10,000 or even about 1,000 to 5,000. Some of the polymers of this type employed in the present invention have a relatively high viscosity at 25° C., say at least about 50 or 60 poises. If desired, the polymers may be further treated, for instance by hydrogenation to satisfy part of the unsaturation.

Polyhydroxy-terminated, diene polymers of the type disclosed in U.S. Pat. No. 3,338,861 may be employed in the present invention. As discussed more fully in the patent, such polyhydroxy-terminated polymers may be made by polymerizing conjugated dienes of about 4 to 8 carbon atoms with lithium metal to obtain a polymeric product having the desired molecular weight. The product may then be treated with a suitable terminating agent, such as ethylene oxide, propylene oxide, formaldehyde, etc., to provide hydroxy-termination. By using this procedure, polyhydroxy-terminated, diene polymers having molecular weights from about 700 to 1,200 may be obtained.

Other polyhydroxy-terminated, diene polymers that may be employed in the present invention include those of the type disclosed in U.S. Pat. No. 2,877,212. According to the patent, the polymers are prepared by polymerizing ethylenically-unsaturated monomers, including conjugated dienes, in the presence of certain free radical catalysts. Conjugated dienes disclosed for use in preparing the polymers include butadiene, isoprene, 2,3-dimethyl-butadiene, chloroprene, etc. The resultant polymers are terminated at each end with functional groups that may be readily convertible to the desired groups by known chemical transformations. Free radical catalysts disclosed for making the polymers include aliphatic azodicarboxylates. The polymeric products obtained are, according to the patent, viscous oils under standard conditions, the products having hydroxyl numbers of from about 20 to 70 and molecular weights of from about 1,000 to 5,000.

A group of preferred hydroxy-terminated, diene polymers of the present invention are described in U.S. Pat. No. 3,714,110 as having primary hydroxyl groups which are allylic in configuration, thereby being of a more reactive nature in the urethane-forming reaction and apparently providing improved stability in the urethane product. The preferred diene polymer also has the majority of its unsaturation in the main hydrocarbon chain, providing polymers of improved elastic characteristics. These polymers have also been found to have high trans-1,4-unsaturation. There may be more than two hydroxyls in the polymer molecule, which provides reactive sites that may dispense with the need to employ excess isocyanate or other extraneous cross-linking agents, e.g., trifunctional reactants such as triol, in the urethane-forming reaction when cross-linking properties are desired.

Dienes which may be employed to make the hydroxy-terminated, diene polymers include unsubstituted, 2-substituted or 2,3-disubstituted 1,3-dienes of up to about 12 carbon atoms. The diene preferably has up to about 6 carbon atoms and the substituents in the 2-and/or 3-position may be hydrogen, alkyl, generally lower alkyl, e.g., of 1–4 carbon atoms, halogen, nitrile, etc. Typical dienes which may be employed are 1,3-butadiene, isoprene, chloroprene, 2-cyano-1,3-butadiene, 2,3-dimethyl-1,3-butadiene, etc. A preferred diene polymer which may be employed is of the type disclosed in U.S. Pat. No. 3,674,743. This diene polymer has the majority of its unsaturation in the main hydrocarbon chain, a Brookfield viscosity at 30° C. of about 5–20,000 poises, a number average molecular weight of about 400 to 25,000, and can be made by hydrogen peroxide catalyzed, free-radical polymerization at a temperature of about 100° to 200° C. These diene polymers may be made in a mutual solvent, e.g., isopropanol.

The hydroxy-terminated, diene polymers used in accordance with the present invention preferably have a hydroxyl-functionality greater than two, e.g., in the range of 2.1 to 2.6, although the functionality may be greater, e.g., it may range up to about three or more. The preferred polymers have been found to have primary hydroxyl groups in terminal allylic positions on the main, generally longest, hydrocarbon chain of the molecule. By "allylic" configuration is meant the alpha-allylic grouping of allylic alcohol, that is, the hydroxyls of the diene polymer are attached to a carbon adjacent a double-bond carbon. Diene polymers of the desired configuration may be obtained, for instance, by using a procedure of the type set forth in the specification of U.S. Pat. No. 3,714,110 at column 5, line 63 through column 6, line 27.

The useable liquid (including semi-solid, etc.) hydroxy-terminated, diene polymers of butadiene will preferably conform to the following simplified chemical structure:

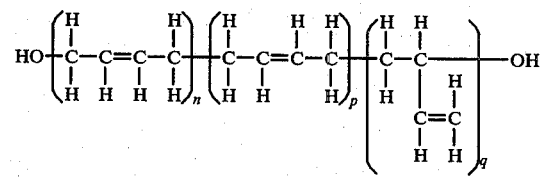

in which n plus p is greater than 2, that is, the inchain unsaturation accounts for more than 50% of the unsaturation. One or more of the hydrogen atoms appearing in the above formula will be replaced by hydroxyl in at least some of the molecules. This formula should not be understood as implying that the polymers are necessarily in blocks, but the cis-1,4-, trans-1,4- and vinyl (1,2) unsaturation are usually distributed throughout the polymer molecule. The letter n may be a number sufficient to give a cis-1,4-unsaturation content of about 10–30 percent; p may be a number sufficient to give a trans-1,4-unsaturation content to the polymer in the range of about 40–70 percent; while q may be sufficient to give a pendant 1,2-vinyl unsaturation of about 10–35 percent. Often the polymer will contain largely trans-1,4-units, e.g., about 50–65 percent and about 15–25 percent cis-1,4-units, with about 15–25 percent 1,2-units. Branching may also occur in the above polymers, especially those prepared at higher temperatures. It should be emphasized, however, that the present invention is not necessarily limited to the use of hydroxyl-containing polydiolefins having the predominating trans-1,4-structure, although such are preferred.

Olefinically-unsaturated monomers may be incorporated into the diene polymers used in this invention, although generally in minor amounts. These monomers may be components which provide additional cross-linking sites for the polyisocyanate or other urethane-producing agent. Useable monomers include alpha-mono-olefinic materials of about 2 or 3 to 10 or 12 carbon atoms such as styrene, methyl methacrylate, acrylonitrile, and the like. The choice and amount of mono-olefinic monomer employed will often be determined on the basis of properties desired in the final resin. Preferably, the amount of mono-olefinic monomer in the polymer, if any, will be about 1 to 40 weight %, or even about 10–40%.

Reaction of pendant vinyl groups present in the hydroxy-terminated dienepolymer-polyurethane improves the thermal stability characteristics of the product. For instance, it has been found that undesirable swelling of the products upon exposure to heat may be greatly reduced or eliminated. According to the present invention, reaction of pendant vinyl groups may be achieved by providing a peroxide catalyst in the composition, preferably as part of the curing polyol component. The peroxide may be added in a minor amount sufficient to promote reaction of the pendant vinyl groups, e.g., from about 0.1 to 10 percent based upon the total weight of the system, although about 1 to 3 percent by weight is preferred and about 2 percent by weight is most preferred.

The peroxide should be chosen to maintain sufficient activity during storage prior to addition to the polymer. In this regard peroxides of a relatively high temperature half-life are preferred. Typically these preferred peroxides may have a ten-hour, half-life temperature of at least about 70° C., preferably at least about 100° C. or even higher, e.g., up to about 120° C. Peroxide promoters which are suitable for use in cross-linking the polymers include organic as well as inorganic peroxides. Preferred peroxide promoters are organic peroxides, and include, for instance, t-butyl hydroperoxide, diisopropylbenzene hydroperoxide, cumene hydroperoxide, 2,5-dihydroperoxy-2,5-dimethylhexane, p-menthane hydroperoxide, 2,5-di(t-butylperoxy)-2,5-dimethyl-hexane-3, diethyl peroxide, di-t-butyl peroxide, 2,5-di(t-butylperoxy)-2,5-dimethylhexane, 1,4-bis(2-t-butyl-peroxyisopropyl)-benzene, dicumyl peroxide, n-butyl 4,4-bis(t-butylperoxy)-valerate, di-t-butyl diperoxy-succinate, t-butyl peroxybenzoate, di-t-butyl diperoxyphthalate, t-butyl peroxyacetate, 2,2-bis(t-butylperoxy)butane, 2,5-di(benzoylperoxy)-2,5(dimethyl-hexane, O,O-t-butyl O-t-butyl O-isopropyl monoperoxycarbonate, t-butyl peroxycrotonate, t-butyl monoperoxy-maleic acid, di(1-hydroxyheptyl) peroxide, t-butyl peroxyisobutyrate, di(4-chlorobenzoyl) peroxide, t-butyl peroxy-2-ethylhexanoate, and dibenzoyl peroxide. The most preferred promoter is alpha,alpha,bis(t-butylperoxy) diisopropylbenzene.

According to the present invention either or both of the polyurethane prepolymer component and the curing polyol component may include a minor amount based on the total system of drying oil having a maximum iodine number of up to about 200, preferably an iodine number of about 100 to 200. The drying oil serves to reduce the viscosity of the diene polymer polyol whether used in one or both of the prepolymer or the curing polyol. Also, the drying oil improves the flexibility of the cured products and their surface characteristics, but the use of excessive amounts may cause the cured products to swell or split. In general, less than about 40% by weight, preferably up to about 30% or 35% by weight, drying oil may be present in the total system, and the oil is generally at least about 5, preferably at least about 10 or 15% by weight of the system. The use of linseed oil in amounts of about 40% has led to undesirable swelling or splitting of the cured resin product. The drying oil may be in one or both of the prepolymer and curing polyol, or may be added separately to the system. When the drying oil is combined with the hydroxy-terminated diene polyol component in either the prepolymer or the curing polyol, the weight ratio of diene polyol to drying oil is often about 1.5 to 5:1, preferably about 2 to 4:1.

The drying oil serves to lower the viscosity of the diene polymer making it more readily handled as, for instance, the curing polyol component. The viscosity of such mixtures is often less than about 40 poises at 25° C., preferably about 5 to 30 poises at 25° C. The mixtures may have such viscosities when, for example, the diene polymer has a viscosity of at least about 50 or 60 poises at 25° C. If the diene polymer is of lower viscosity the addition of the drying oil will still reduce the viscosity of the polymer advantageously. The lower the viscosity of the polymer components the more readily they may penetrate into crevices and other small spaces in various materials such as electrical equipment to which the polymers are applied and thereby better exert their protective properties. It is preferred that the drying oil reduce the viscosity of the diene polymer by at least about 25 percent or even at least about 50%. The drying oil is also an ultimate reactant which, along with the peroxide component, leads to products that have the highly desirable characteristics described.

As used herein the term "drying oil" includes acids, or more often esters, of low molecular weight polyols, especially glycerides in natural form. The term also includes synthetic drying oils which can be made from unsaturated fatty acids of the drying type, i.e., those having about two or more olefinically-unsaturated double bonds per fatty acid residue. The drying oils include ethylenically-unsaturated fatty acids and their esters having up to about 22 carbon atoms in the fatty acid moieties, especially about 12 to 18 carbon atoms. These fatty acid materials often contain from two to about three or more olefinic double bonds per acid moiety. The viscosity of such materials is often less than about 0.6 poise, say about 0.4 to 0.5 poise, at 25° C. The esters are frequently esters of the fatty acid variety and a low molecular weight polyol having three or more hydroxyl groups per molecule. In their naturally-occurring forms the esters are generally glycerides. Esters of polyols having about three to four hydroxyl groups per molecule are preferred. The unsaturated fatty acid materials include, for example, linoleic acid, linolenic acid, eleostearic acid, licanic acid, and the like. Especially useful are the fatty acid esters derived from natural sources such as sunflower oil, linseed oil, menhadden oil, safflower oil, soybean oil, dehydrated castor oil, and the like. Linseed oil is a particularly advantageous drying oil because it not only may function to reduce viscosity, but it also improves the resiliency of the cured resin. Furthermore, because it may react with pendant vinyl groups present in the polymer, the oil may not extrude from the system during heat-aging as is typical of non-reactive oils.

Where drying oil is present as an ester of a polyunsaturated fatty acid and a low molecular weight polyol and where there is sufficient of the latter present to provide excess hydroxyl groups, it may participate in the urethane-forming reaction when added as a constituent part of the polyol component, i.e., before all the isocyanate groups of the prepolymer first component are reacted. Such unsaturated ester polyols may be formed, for instance, by transesterification of linseed oil with pentaerythritol.

The compositions of this invention may contain other components. For example, finely-divided, fillers may be added to provide body or even improve product characteristics. Among the useful, essentially inert fillers are silica, alumina, talc and the like. The filler may be a minor or major amount of the composition.

The following examples relating to this invention are to be considered illustrative only and not limiting. In these examples POLY BDR45 HT is a homopolymer of butadiene made by Arco Chemicals, typically having a viscosity of 60 poises at 30° C., a hydroxyl value of 0.83 meq/gm, a hydroxyl number (mg.KOH/gm) of 46.6, an average molecular weight of 2800, and an iodine number of 398.

In the following examples, it is shown in Examples 1 and 2 that polyurethanes made from castor oil-derived prepolymers exhibit considerable heat instability whether the prepolymer is cured with castor oil or diene polymer POLY BDR45 HT. In other tests the polyol employed in both the prepolymer and curing components was the diene polymer. When a peroxide catalyst was added to the curing polyol component in the latter system, the heat stability of the cured products was markedly improved, see Example 3. However, such polyol materials have undesirably high viscosities.

In accordance with the present invention this disadvantage is overcome and other advantages provided by employing a drying oil as described herein. For example, a prepolymer made from about 39% POLY BDR45 HT and 61% Isonate 143L had a viscosity of 75 poises at 25° C. In comparison, a prepolymer made from approximately 48% Isonate 143L, 25% POLY BDR45 HT, and 27% linseed oil had a viscosity of only about 10 poises at 25° C. Also, in Example 4 below, it is seen that a polyol-drying oil blend had a viscosity of only 17 poises at 25° C., and it was composed of about 60% POLY BDR45 HT, 15% castor oil and 25% linseed oil. This polyol-linseed oil blend was advantageously employed in making the products of the present invention in accordance with several of the following examples.

EXAMPLE 1

Six thousand three hundred and thirty-six grams of Isonate 143L (Upjohn), a polyphenylene polyisocyanate, was charged to a 3-neck, round bottom flask and stirred under a nitrogen atmosphere. Two thousand eight hundred grams of castor oil was added and the mix was heated by a mantle to 85°–95° C. and held until the NCO value remained constant at 16.2%.

Forty-five parts of the above prepolymer was mixed with 55 parts of castor oil (900 cps viscosity) to give an NCO/OH ratio of 1.1. The mix was then warmed to 40°–50° C. and degassed to remove air bubbles. The mix was the poured in 57 mm. diameter aluminum dishes to the top (1.5 cm.). The samples were cured overnight at room temperature followed by heating at 85° C. for 2 hours.

These samples were placed in a forced air oven at 200° C.±1°. After 24 hours the samples had expanded 4 cm. in height to a total height of 5.5 cm.

EXAMPLE 2

Twenty parts of the prepolymer prepared in Example 1 was mixed with 80 parts of POLY BDR45 HT. The resulting NCO/OH ratio was 1.1.

These samples were placed in a forced air oven at 200° C.±1. After 24 hours the samples had expanded 3.5 cm. in height to a total height of 5.0 cm.

EXAMPLE 3

One thousand eight hundred seventy-four grams of Isonate 143L was charged to a 3 neck, round bottom flask and stirred under $N_2$. One thousand one hundred forty-four grams of POLY BDDR45 HT was added and the mix was heated to 160°–170° C. and held until the NCO value remained constant at 15.5%. The prepolymer was cooled to 100° C. and 3 grams of benzoyl chloride was added.

Seventy-nine parts of POLY BDR45 HT, having a viscosity of 80 poises at 25° C. was mixed with 21 parts of the above prepolymer and 2 parts of ditertiary butyl peroxide to give a resulting NCO/OH ratio of 1.1. Samples were prepared as in Example 1.

These samples were placed in a forced air oven at 200° C.±1. After 14 days there was no expansion in height and the weight loss of the polymer was about 3.5%.

EXAMPLE 4

A polyol was prepared by blending 1800 grams of POLY BDR45 HT, 450 grams of castor oil and 750 grams of Superior linseed oil (Spencer Kellogg). The resulting polyol had a viscosity of 17 poises at 25° C.

Seventy-six parts of the above polyol was mixed with 24 parts of the prepolymer prepared in Example 3, and 2 parts of ditertiary butyl peroxide to give a NCO/OH ratio of 1.1. Samples were prepared by the procedure described in Example 1.

These samples were placed in a forced air oven at 200° C.±1° C. After 56 days there was no expansion in height and there was a weight loss of 7.14%.

EXAMPLE 5

Seven hundred seventy-one grams of PAPI 901 were charged to a 3 neck, round bottom flask and stirred under $N_2$. 572 grams of POLY BDR45 HT was added and the mix was heated to 160°–170° C. and held until the NCO value remained constant at 15.1%. The prepolymers was cooled to 100° C. and 1.3 grams of benzoyl chloride was added.

Seventeen parts of the above prepolymer was mixed with 63 parts of POLY BDR45 HT, 20 parts linseed oil and 2 parts of ditertiary butyl peroxide to give a resulting NCO/OH ratio of 1.1. Samples were prepared as in Example 1.

These samples were placed in a forced air oven at 200° C.±1. After 14 days there was no expansion in height and there was a weight loss of 3.6%.

EXAMPLE 6

Seventy-nine parts of the polyol in Example 4 was mixed with 21 parts of the prepolymer in Example 3 and 2 parts of alpha,alpha-bis(t-butylperoxy)diisopropyl benzene to give an NCO/OH ratio of 1.1. Samples were prepared as in Example 1.

These samples were placed in forced air ovens at 200° C., 220° C. and 230° C. After 84 days the samples did not expand or crack and had weight losses of 7.0%, 8.0% and 8.2%, respectively. Graphic extrapolation of this data to estimate the time to a ten percent weight loss gave 7,000 days, 2,100 days and 1,200 days, respectively. A plot of the logarithm of the time to a ten percent weight loss versus the reciprocal of the absolute temperature for these samples can be made. This so-called "Arhennius Plot" allows extrapolation of the data to lower use temperatures. From the plot the time to a ten percent weight loss at Underwriter Laboratories Class F (155° C.) operating temperature would be estimated to be 150,000 days.

EXAMPLE 7

A polyol was prepared by blending 300 grams of POLY BDR45 HT, 50 grams of castor oil and 150 grams of dehydrated castor oil. The resulting polyol had a viscosity of 22 poises.

Eighty-three parts of the above polyol was mixed with 17 parts of the prepolymer prepared in Example 3 and 2 parts of ditertiary butyl peroxide to give a NCO/OH ratio of 1.0. Samples were prepared as in Example 1.

These samples were placed in a forced air oven at 200° C.±1. After 3 days there was no expansion, and there was a weight loss of 3.6%.

EXAMPLE 8

Twenty-eight parts of the prepolymer prepared in Example 3 was mixed with 72 parts of the polyol prepared in Example 4 to give an NCO/OH ratio of 1.0. Samples were prepared as in Example 1 containing 0, 1 and 1.5% ditertiary butyl peroxide, respectively.

These samples were placed in a forced air oven at 200° C.±1. The samples with no peroxide expanded three to four cm. after 1 day, those with 1% ditertiary butyl peroxide expanded three to four cm. after 5 days, and those with 1.5% ditertiary butyl peroxide expanded only one to three mm. and had a weight loss of 6.2% after 14 days.

EXAMPLE 9

One hundred sixteen parts of the polyol prepared in Example 4, 350 parts of Birkley #1 dry sand and 3 parts of alpha,alpha-bis(t-butylperoxy)diisopropyl benzene are mixed together with 31 parts of the prepolymer prepared in Example 3 to give an NCO/OH ratio of 1.1. Samples were prepared as in Example 1.

These samples were placed in forced air ovens at 200° C.±1 and 230° C.±1. After 28 days there was no expansion and the weight losses were 2.5% at 200° C. and 7.6% at 230° C.

What is claimed is:

1. A polyurethane resin system which comprises an isocyanate-terminated polyurethane prepolymer of polyisocyanate and first polyol component, and a second polyol component for reacting with said prepolymer to form a polyurethane resin polymer having pendant vinyl groups provided by the presence of a hydroxy-terminated diene polymer polyol in one or both of said first and second polyol components, said system further comprising drying oil having an iodine number of up to about 200 in a minor amount sufficient to reduce substantially the viscosity of said diene polymer polyol; and a peroxide catalyst in an amount sufficient to promote reaction of said pendant vinyl groups to provide a relatively thermally-stable, polyurethane resin product when cured.

2. A resin system of claim 1, wherein said hydroxy-terminated diene polymer is provided in said system as a component of said second polyol component.

3. A resin system of claim 1, wherein said polyisocyanate comprises a relatively non-volatile aromatic polyisocyanate.

4. A resin system of claim 1, 2 or 3 wherein said first polyol has a hydroxyl-functionality of about 2.3 to 3.

5. A resin system of claim 1, 2 or 3 wherein said second polyol component contains hydroxy-terminated diene polymer having a hydroxyl functionality of about 2.3 to 3.

6. A resin system of claim 1, 2 or 3 wherein said drying oil comprises linseed oil.

7. A resin system of claim 1, 2 or 3 wherein said drying oil is present in one or both of said prepolymer and second polyol in which said hydroxy-terminated diene polymer component is present.

8. A resin system of claim 7 in which said diene polymer comprises polybutadiene.

9. A polyurethane resin system which comprises an isocyanate-terminated polyurethane prepolymer of polyisocyanate and first polyol component, said prepolymer having an isocyanate group content of at least about 10 weight percent, and a second polyol component for reacting with said prepolymer to form a polyurethane resin polymer having pendant vinyl groups provided by the presence in said second polyol of hydroxy-terminated diene polymer, and said second polyol component containing drying oil having an iodine number of up to about 200 in an amount sufficient to reduce substantially the viscosity of said second polyol, and containing a peroxide catalyst in an amount sufficient to promote reaction of said pendant vinyl groups to provide a thermally-stable, polyurethane resin product when cured.

10. The resin system of claim 9, wherein said hydroxy-terminated diene polymer comprises polybutadiene having a viscosity of at least about 50 poises at 25° C.

11. The resin system of claim 10, wherein said polyisocyanate is an aromatic polyisocyanate having a vapor pressure of less than about 0.0005 mm. Hg at 25° C.

12. The resin system of claim 9, 10 or 11 wherein said hydroxy-terminated diene polymer has a hydroxyl-functionality of about 2.3 to 3.

13. The resin system of claim 12 wherein said drying oil is linseed oil.

14. The resin system of claim 12 wherein said drying oil is about 10 to 30% of said system.

15. The resin system of claim 14 wherein said drying oil is linseed oil.

16. The resin system of claims 9, 10 or 11 wherein said peroxide catalyst has a ten-hour, half-life temperature of about 100° to 120° C.

17. The resin system of claim 16 wherein said hydroxy-terminated diene polymer has a hydroxyl-functionality of about 2.3 to 3.

18. The resin system of claim 17 wherein said drying oil is about 10 to 30% of said system.

19. The resin system of claim 18 wherein said drying oil is linseed oil.

20. The resin system of claim 19 in which said peroxide catalyst is alpha,alpha-bis(t-butylperoxy)diisopropylbenzene.

* * * * *